US006403134B1

(12) United States Patent
Nayyar et al.

(10) Patent No.: US 6,403,134 B1
(45) Date of Patent: Jun. 11, 2002

(54) PREMIUM QUALITY INTERMEDIATE MOISTURE VEGETABLES AND METHOD OF MAKING

(75) Inventors: Dalip K. Nayyar, Grayslake; Laura G. Hill, Prospect Heights; K. Rajinder Nauth, Wheeling; Jimbay P. Loh, Green Oaks; Maluwa Behringer; Lisa Apel, both of Evanston, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/638,335

(22) Filed: Aug. 14, 2000

(51) Int. Cl.[7] .............................. A23B 7/00; A23C 21/08; A23L 1/212
(52) U.S. Cl. ......................... 426/335; 426/42; 426/43; 426/615; 426/639; 426/640
(58) Field of Search ......................... 426/42, 43, 335, 426/615, 639, 640

(56) References Cited

U.S. PATENT DOCUMENTS

| | | |
|---|---|---|
| 2,191,835 A | 2/1940 | Snelling |
| 3,408,208 A | 10/1968 | Lamb |
| 3,623,893 A | 11/1971 | Mauge |
| 3,745,027 A | 7/1973 | Kaplow et al. |
| 3,930,034 A | 12/1975 | Shanbhag et al. |
| 4,002,772 A | 1/1977 | Hass |
| 4,006,259 A | 2/1977 | Kalmar |
| 4,006,260 A | 2/1977 | Webb et al. |
| 4,039,470 A | 8/1977 | Kalmar |
| 4,061,785 A | 12/1977 | Nishjno et al. |
| 4,103,035 A | 7/1978 | Fulger et al. |
| 4,127,947 A | 12/1978 | Webb et al. |
| 4,135,003 A | 1/1979 | Mohwinkel |
| 4,292,331 A | 9/1981 | Ostre |
| 4,336,273 A | 6/1982 | Lee |
| 4,344,971 A | 8/1982 | Garbutt |
| 4,350,711 A | 9/1982 | Kahn et al. |
| 4,361,589 A | 11/1982 | Wauters |
| 4,390,550 A | 6/1983 | Kahn et al. |
| 4,447,460 A | 5/1984 | Lewis et al. |
| 4,473,591 A | 9/1984 | Segner et al. |
| 4,478,860 A | 10/1984 | Hakal et al. |
| 4,542,033 A | 9/1985 | Agarwala |
| 4,701,330 A | 10/1987 | Rogers et al. |
| 4,716,115 A | 12/1987 | Gonzalez et al. |
| 4,740,593 A | 4/1988 | Gonzalez et al. |
| 4,764,385 A | 8/1988 | Butland |
| 4,792,455 A | 12/1988 | Tallafus |
| 4,814,192 A | 3/1989 | Sapers et al. |
| 4,818,549 A | 4/1989 | Steiner et al. |
| 4,832,969 A * | 5/1989 | Liotas ........................ 426/615 |
| 4,910,031 A * | 3/1990 | Budd et al. .................... 426/96 |
| 4,946,693 A | 8/1990 | Risler et al. |
| 4,948,609 A | 8/1990 | Nafisi-Movaghar |
| 4,988,523 A | 1/1991 | Gardner et al. |
| 5,110,609 A | 5/1992 | Lewis et al. |
| 5,280,042 A | 1/1994 | Lopes |
| 5,451,369 A | 9/1995 | Daeschel et al. |
| 5,518,747 A | 5/1996 | Pike, Jr. |
| 5,564,527 A | 10/1996 | Coffey et al. |
| 5,703,124 A | 12/1997 | Takata et al. |
| 5,895,680 A | 4/1999 | Cirigliano et al. |
| 5,925,395 A | 7/1999 | Chen |
| 6,027,751 A | 2/2000 | Romick et al. |
| 6,033,704 A | 3/2000 | Talley |

OTHER PUBLICATIONS

Domino Sugar Corporation—May, 1995 Tentative Product Information on "Super Envision®" Flavor & Texture Modifier, 5 pages.

* cited by examiner

Primary Examiner—Helen Pratt
(74) Attorney, Agent, or Firm—Fitch, Even, Tabin & Flannery

(57) ABSTRACT

Premium quality intermediate moisture vegetables and methods for preparing such vegetables are provided. The premium quality intermediate moisture vegetables are prepared by (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables. After drying to a water activity of about 0.5 to about 0.9, the intermediate moisture vegetables of the present invention are shelf stable. For example, such intermediate moisture vegetables having a water activity of about 0.55 to about 0.65 are expected to be shelf stable for about twelve months under ambient conditions; intermediate moisture vegetables having a water activity of about 0.75 to about 0.85 are expected to be shelf stable for about 90 days under refrigeration conditions. When cooked, these intermediate moisture vegetables provide appearance, texture, and taste similar to that provided by high quality cooked frozen vegetables.

35 Claims, No Drawings

PREMIUM QUALITY INTERMEDIATE MOISTURE VEGETABLES AND METHOD OF MAKING

FIELD OF THE INVENTION

This invention relates to premium quality intermediate moisture vegetables and methods for preparing such vegetables. More specifically, this invention relates to premium quality intermediate moisture vegetables prepared using an infusion cocktail comprising an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture. This invention also relates to premium quality intermediate moisture vegetables prepared using an infusion cocktail comprising an aqueous solution of (1) a water-soluble, predominantly lower molecular weight, low sweetness carbohydrate, (2) a polyhydric alcohol, (3) salt, and (4) a non-inorganic sweetness depressant agent. After drying to a water activity of about 0.5 to about 0.9, the intermediate moisture vegetables of the present invention are shelf stable. For example, such intermediate moisture vegetables having a water activity of about 0.55 to about 0.65 are expected to be shelf stable for about twelve months under ambient conditions; intermediate moisture vegetables having a water activity of about 0.75 to about 0.85 are expected to be shelf stable for about 90 days under refrigeration conditions. When cooked, these intermediate moisture vegetables provide appearance, texture, and taste similar to that provided by high quality cooked frozen vegetables.

BACKGROUND OF THE INVENTION

Dried packaged convenience foods or mixes, such as, for example, soups, casseroles, salads, and the like, are popular. Such foods or mixes frequently contain various types of dehydrated vegetables (generally with water activities of less than about 0.5) along with other food components. Unfortunately, such dehydrated vegetables, when cooked, tend to rehydrate slowly, require long cooking times, and generally do not resemble fresh vegetables in terms of color, appearance, texture, and/or nutrition.

Numerous attempts have been made to prepare dehydrated vegetables having improved properties. U.S. Pat. No. 3,623,893 (Nov. 30, 1971) used super-atmospheric pressures (i.e., 200 to 4000 psi) to infuse foods, including vegetables, with an aqueous infusion cocktail containing propylene glycol, potassium sorbate, glycerol, and salt. Of course, the use of such high pressures would involve high capital expense if such a system were used commercially.

U.S. Pat. No. 3,745,027 (Jul. 10, 1073) provided a method for cooking vegetables in an infusion mixture containing, for example, glycerol, salt, propylene glycol, potassium sorbate, and water. For example, diced carrots cooked for 15 minutes in the infusion mixture and then soaked for 6 hours in the infusion mixture were reported to have "acceptable eating qualities and microorganic stability."

U.S. Pat. No. 4,832,969 (May 23, 1989) provides improved dried green vegetables using an infusion cocktail containing a polyhydric alcohol, a sugar, an alkaline buffering system or agent (i.e., sufficient to obtain a cocktail pH of about 6 to 8), an inorganic bittering agent (e.g., KCl and/or $MgCl_2$), a surfactant, salt, and an anti-oxidant (e.g., vitamin E, tocopherol, BHA, BHT, or mixtures thereof). After treatment with the infusion cocktail, the vegetable pieces are dried to a water activity of about 0.3 to 0.85 at a temperature of less than about 135° F. The resulting dried green vegetables are reported to have superior color retention for extended time periods even at room temperature storage, superior texture upon rehydration, and excellent rehydration rates.

U.S. Pat. No. 4,946,693 (Aug. 7,1990) provides a process for preparing intermediate moisture vegetables. In this process, vegetables are blanched or cooked, preferably using a microwave oven, and then partially dried (i.e., water content of 45 to 55 percent). The dried vegetables are then dry mixed with salt (and optionally sodium glutamate if the vegetables are not cooked using a microwave oven); an anti-mycotic agent can also be added.

U.S. Pat. No. 5,110,609 (May 5, 1992) provides a method for producing intermediate moisture vegetables wherein the vegetables are partially dehydrated to a moisture content of 26 to 60 percent and then stored in an oxygen free atmosphere.

U.S. Pat. No. 5,925,395 (Jul. 20, 1999) provides a method for preserving vegetables whereby the vegetables are treated with a preservative solution containing water, calcium ions, and optionally ascorbic acid or erythorbic acid. The resulting vegetables are then stored at a non-freezing temperature less than 20° C. If stored at ambient temperatures, microbial contamination is possible.

Although these methods can provide improved intermediate moisture vegetables, there remains a need for even further improvements. The present method provides such improvements. Indeed, the present method allows the preparation of intermediate moisture vegetables which are shelf stable and which have significantly improved organoleptic properties. In taste tests, the present intermediate moisture vegetables were often ranked as good as or even better than the original vegetables.

SUMMARY OF THE INVENTION

This invention relates to premium quality intermediate moisture vegetables and methods for preparing such vegetables. More specifically, this invention relates to premium quality intermediate moisture vegetables prepared using an infusion cocktail comprising an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture. Preferably, the infusion cocktail also contains an anti-mycotic agent, a release agent, and calcium lactate.

Although it is preferred that the infusion cocktail contain the nisin-containing whey derived from a nisin-containing culture, infusion cocktails without such nisin-containing whey can also be used in the present invention. Such infusion cocktails comprise an aqueous solution of (1) a water-soluble, predominantly lower molecular weight, low sweetness carbohydrate, (2) a polyhydric alcohol, (3) salt, and (4) a non-inorganic sweetness depressant agent. Preferably, such infusion cocktails also contain an anti-mycotic agent, a release agent, and calcium lactate.

After drying to a water activity of about 0.5 to about 0.9, the intermediate moisture vegetables of the present invention are shelf stable. For example, such intermediate moisture vegetables having a water activity of about 0.55 to about 0.65 are expected to be shelf stable for about twelve months under ambient conditions; intermediate moisture vegetables having a water activity of about 0.75 to about 0.85 are expected to be shelf stable for about 90 days under refrigeration conditions. When cooked, these intermediate moisture vegetables provide appearance, texture, and taste similar to that provided by high quality cooked frozen vegetables.

The present premium quality intermediate moisture vegetables are prepared by a method comprising (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables. Preferably, the vegetables subjected to the present process are instantly quick-frozen or freshly prepared. The shelf life of the intermediate moisture vegetables can be adjusted or modified using the final water activity. For example, intermediate moisture vegetables dried to a water activity of about 0.75 to about 0.85 (and properly packaged) are expected to have a shelf life of about 90 days under refrigeration conditions; intermediate moisture vegetables dried to a water activity of about 0.55 to about 0.65 (and properly packaged) are expected to have a shelf life of about 12 months under ambient conditions.

DETAILED DESCRIPTION OF THE INVENTION

The present invention relates to premium quality intermediate moisture vegetables prepared using an infusion cocktail comprising an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture. One preferred infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, (5) nisin-containing whey derived from a nisin-producing culture, (6) an anti-mycotic agent, (7) a release agent, and (8) calcium lactate. Preferably, the infusion cocktail is an aqueous solution containing (1) about 30 to about 65 percent water-soluble, predominantly lower molecular weight, low sweetness carbohydrates, (2) about 1 to about 15 percent polyhydric alcohols, (3) about 0.1 to about 0.7 percent salt, (4) about 0.1 to about 1 percent non-inorganic sweetness depressant agents, (5) about 1 to 8 percent nisin-containing whey derived from a nisin-producing culture, (6) 0 to about 2000 ppm anti-mycotic agents, (7) about 0 to about 0.5 percent release agents, and (8) 0 to about 3 percent calcium lactate. More preferably, the infusion cocktail is an aqueous solution containing (1) about 40 to about 60 percent water-soluble, predominantly lower molecular weight, low sweetness carbohydrates, (2) about 6 to about 10 percent polyhydric alcohols, (3) about 0.3 to about 0.5 percent salt, (4) about 0.5 to about 0.7 percent non-inorganic sweetness depressant agents, (5) about 2 to about 4 percent nisin-containing whey derived from a nisin-producing culture, (6) 0 to 800 ppm anti-mycotic agents, (7) 0 to about 0.4 percent release agents, and (8) 0 to about 3 percent calcium lactate. Even more preferably, the infusion cocktail is an aqueous solution containing (1) about 40 to about 60 percent water-soluble, predominantly lower molecular weight, low sweetness carbohydrates, (2) about 6 to about 10 percent polyhydric alcohols, (3) about 0.3 to about 0.5 percent salt, (4) about 0.5 to about 0.7 percent non-inorganic sweetness depressant agents, (5) about 2 to about 4 percent nisin-containing whey derived from a nisin-producing culture, (6) about 100 to 800 ppm anti-mycotic agents, (7) about 0.2 to about 0.4 percent release agents, and (8) about 0.5 to about 2 percent calcium lactate. The infusion cocktail generally has a solids content of about 40 to about 75 percent, and preferably about 50 to about 60 percent. The use of such high solids in the infusion cocktail provides a high osmotic pressure and appears to accelerate the infusion rates. One preferred anti-mycotic agent is an approximately 1 to 1 blend or mixture of potassium sorbate and sodium benzoate; one preferred release agent is an high HLB (i.e., about 8 to about 10) soy lecithin. The pH of the infusion cocktail should generally be about 4.5 or higher, preferably about 4.5 to 7, and more preferably about 5 to about 6. Of course, the infusion cocktail can include other components such as, for example, spices, flavorants, other preservatives, nutrients, vitamins, nutraceutical additives, and the like.

The present invention also relates to premium quality intermediate moisture vegetables prepared using an infusion cocktail comprising an aqueous solution of (1) a water-soluble, predominantly lower molecular weight, low sweetness carbohydrate, (2) a polyhydric alcohol, (3) salt, (4) and a non-inorganic sweetness depressant agent. Another preferred infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, (5) an anti-mycotic agent, (6) a release agent, and (7) calcium lactate). Preferably, the infusion cocktail is an aqueous solution containing (1) about 30 to about 65 percent water-soluble, predominantly lower molecular weight, low sweetness carbohydrates, (2) about 1 to about 15 percent polyhydric alcohols, (3) about 0.1 to about 0.7 percent salt, (4) about 0.1 to about 1 percent non-inorganic sweetness depressant agents, (5) 0 to about 2000 ppm anti-mycotic agents, (6) about 0 to about 0.5 percent release agents, and (7) 0 to about 3 percent calcium lactate. More preferably, the infusion cocktail is an aqueous solution containing (1) about 40 to about 60 percent water-soluble, predominantly lower molecular weight, low sweetness carbohydrates, (2) about 6 to about 10 percent polyhydric alcohols, (3) about 0.3 to about 0.5 percent salt, (4) about 0.5 to about 0.7 percent non-inorganic sweetness depressant agents, (5) 0 to 800 ppm anti-mycotic agents, (6) 0 to about 0.4 percent release agents, and (7) 0 to about 3 percent calcium lactate. Even more preferably, the infusion cocktail is an aqueous solution containing (1) about 40 to about 60 percent water-soluble, predominantly lower molecular weight, low sweetness carbohydrates, (2) about 6 to about 10 percent polyhydric alcohols, (3) about 0.3 to about 0.5 percent salt, (4) about 0.5 to about 0.7 percent non-inorganic sweetness depressant agents, (5) about 100 to 800 ppm anti-mycotic agents, (6) about 0.2 to about 0.4 percent release agents, and (7) about 0.5 to about 2 percent calcium lactate. The infusion cocktail generally has a solids content of about 40 to about 75 percent, and preferably about 50 to about 60 percent. The use of such high solids in the infusion cocktail provides a high osmotic pressure and appears to accelerate the infusion rates. One preferred anti-mycotic agent is an approximately 1 to 1 blend or mixture of potassium sorbate and sodium benzoate; one preferred release agent is an high HLB (i.e., about 8 to about 10) soy lecithin. The pH of the infusion cocktail should generally be about 4.5 or higher, preferably about 4.5 to 7, and more preferably about 5 to about 6. Of course, the infusion cocktail can include other components such as, for example, spices, flavorants, other preservatives, nutrients, vitamins, nutraceutical additives, and the like.

The infusion cocktail contains a water-soluble, predominantly lower molecular weight, low sweetness carbohydrate. Generally the molecular weight of the low sweetness carbohydrate is less than about 450 g/mole and preferably about less than about 415 g/mole. Especially preferred carbohydrates are high maltose corn syrups. Generally maltose has about 30 percent of the sweetness of sucrose. Maltose is a small molecule which appears to be very effective in infusing the vegetable structure and lowering the water activity. Preferred high maltose corn syrups include Satinsweet 65 and HM 70 (both from Cargill) which have typical viscosities of about 900 and 450 poises, respectively, at about 70° F. The HM 70 high maltose corn syrup, which is especially preferred due to its lower viscosity and relatively higher maltose content, contains about 80 percent solids with about 70 percent maltose, about 4 percent dextrose, about 16 percent maltotrioses, and about 10 percent higher molecular weight fractions on a solids basis. The Satinsweet 65 high maltose corn syrup contains about 81 percent solids with about 65 percent maltose, about 4 percent dextrose, about 15 percent maltotrioses, and about 16 percent higher molecular weight fractions on a solids basis. Preferably the only water-soluble, predominantly lower molecular weight, low sweetness carbohydrate present in the infusion cocktail is the high maltose corn syrup. Generally the water-soluble, predominantly lower molecular weight, low sweetness carbohydrates useful in the present invention contain at least about 60 percent, and preferably at least 65 percent, of maltose and dextrose based on the dry solids.

Polyhydric alcohols (i.e., polyols) are also included in the infusion cocktail as humectants and texture enhancers. Generally the polyhydric alcohols useful in this invention are relatively low molecular weight (i.e., less than about 136 g/mole) alcohols having two or more hydroxyl groups. Examples of suitable polyhydric alcohols include such as glycerol (glycerine or 1,2,3-propanetriol), ethylene glycol, erythritol (1,2,3,4-tetrahydroxybutane), pentaerythritol (5-carbon tetrol (tetrahydroxymethyl) methane), sugar alcohols of the general formula $CH_2OH(CHOH)_nCH_2OH$ where n is 2 to 5, propylene glycol, and the like as well as mixtures thereof. Glycerol is the preferred polyhydric alcohol for use in this invention. The polyhydric alcohols appear to keep the vegetable tissue soft and easily rehydratable during cooking; they also serve to lower the water activity.

Salt is also included in the infusion cocktail. Salt tends to balance the taste profile, reduce aftertaste normally associated with glycerol, act as a taste enhancer, and reduce water activity.

The already low sweetness of the infusion cocktail, and the resulting intermediate moisture vegetables, is further reduced using a non-inorganic sweetness depressant agent or agents. Suitable non-inorganic sweetness depressant agent or agents are generally described in U.S. Pat. No. 4,567,053 (Jun. 28, 1986) and U.S. Pat. No. 5,232,735 (Aug. 3, 1993), both of which are hereby incorporated by reference. An especially preferred non-inorganic sweetness depressant agent is 2-(4-methoxyphenoxy)propionic acid (tradename Lactisole® from Domino Sugar Corp.) or an alkali metal salt thereof with the sodium salt being most preferred. One especially preferred sweetness depressant agent which is commercially available is Super Envision® also from Domino Sugar. Super Envision® is reported to contain about 96 percent sucrose, about 3 percent maltodextrin, about 10,000 ppm Lactisole® (listed as "artificial flavors"), and a maximum of about 1 percent moisture. Inorganic sweetness inhibitors, such as KCl and $MgCl_2$ used in U.S. Pat. No. 4,832,969, should be avoided as they often provide an undesirable, lingering, and conspicuous bitter taste and/or after-taste.

The preferred infusion cocktails of the present invention also employ nisin-containing whey derived from a nisin-producing culture as an anti-microbial agent. For purposes of this invention, the term "nisin-containing whey derived from a nisin-producing culture" is intended to include the whey product, separated from the curd, derived from a nisin-producing culture. Generally, such a nisin-containing whey is obtained by any of a variety of equivalent procedures involving the fermentation of a nisin-producing microorganism. In one such procedure, a pasteurized dairy product such as milk or whey is first inoculated with the nisin-producing microorganism. After the dairy product curdles, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using nisin-producing microorganisms. In this procedure, after the pH in the fermentation has fallen to about 5.5, the pH is then maintained at this value for 8–10 hrs before allowing the pH to drop further. The nisin-containing whey, separated from the corresponding curds, is then employed in the products and methods of this invention. As used herein, "nisin-containing whey derived from a nisin-producing culture" also includes whey described above that has subsequently been reduced in volume to a more concentrated liquid, or that has been completely dried, by evaporation, lyophilization, or comparable procedure. The term relates additionally to such a concentrated or dried whey that is subsequently reconstituted, either partially or completely, by the addition of water or a water-containing composition. Generally, suitable nisin-containing whey for use in the present invention generally contains about 1000 to about 16,000 international units/ml of nisin equivalent activity as determined by well assay using a nisin-sensitive strain of *Lactococcus lactis* subsp. *cremoris*. Nisin activity can be determined using the method of Fowler et al. (Techn. Series. Soc. Bacteriol. 8:91–105 (1975)) with sensitive strain of *L. lactis* subsp. *cremoris* as an indicator.

Although, the infusion cocktails of the present invention preferably use nisin-containing whey, other nisin-containing non-whey preferments produced by growing a nisin-producing culture on any suitable (i.e., wherein the microorganisms can grow and produce nisin) fermentation medium can be used. For purposes of this invention, "nisin-containing whey" is also intended to include such nisin-producing cultures prepared using other fermentation medium. Such alternative fermentation media should include metabolizable soluble carbohydrates (such as, but not limited to, glucose, fructose, sucrose, lactose, maltose, galactose, and the like), soluble proteins (milk, cereal hydrolysates, meat and egg byproducts, fish and seafood, and legumes), and other growth factors necessary to support the growth of culture (e.g., yeast extracts).

The preservative and stabilizing effects of such nisin-containing whey have also be used in the preparation of other food products by the assignee of the present application. Such food products are described in applications entitled "Stabilization of Cooked Meat Compositions Using Whey from Nisin-Producing Cultures", U.S. Ser. No. 60/098,465, filed Aug. 31, 1998; "Stabilization of Mayonnaise Spreads Using Whey from Nisin-Producing Cultures", U.S. Ser. No. 60/098,516, filed Aug. 31, 1998; "Stabilization of Fermented Dairy Compositions Using Whey From Nisin-producing Cultures", U.S. Ser. No. 60/098,518, filed Aug. 31, 1998; and "Stabilization of Cream Cheese Compositions Using Nisin-Producing Cultures", U.S. Ser. No. 60/098,472, filed Aug. 31,1998, and are incorporated hereby in their entireties by reference.

The infusion cocktails may also contain other optional ingredients or components such as, for example, spices, flavorants, other preservatives, nutrients, vitamins, nutraceutical additives, and the like so long as they do not adversely effect the organoleptic and/or stability properties in a significant manner. Suitable vitamins that may be included in the infusion cocktail include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example propyl gallate, octyl gallate, dodecyl gallate, butylated hydroxyanisole, butylated hydroxytoluene, and the like as well as mixtures thereof. Suitable probiotics include, for example *Acidophilus Bifidobacterium, Lactobacillus Johnsonii,* and the like as well as mixtures thereof. Suitable botanicals include, for example St. John's wort, ginseng, ginkgo biloba, and the like as well as mixtures thereof. Of course, as those skilled in the art will realize, other vitamins, minerals, antioxidants, probiotics, and botanticals can also be used in the present invention. The amount of such optional ingredients can, of course, vary considerably depending on the specific nutrient or mineral added (and its recommended daily requirement) and the targeted consumer. For example, macronuterients (e.g., calcium) can be added at relatively high levels (i.e., up to about 5 percent) whereas other trace minerals, vitamins, and other additives (i.e., generally materials having daily adult requirements in the milligram range or lower) will normally be added at much lower levels.

Especially preferred optional ingredients include anti-mycotic agents, release agents or emulsifiers, and calcium lactate. Anti-mycotic agents can be included in the present infusion cocktail at 0 to 800 ppm, preferably at about 100 to 800 ppm. Especially preferred anti-mycotic agents include sodium benzoate and potassium sorbate. An especially preferred anti-mycotic agent is blend of sodium benzoate and potassium sorbate which, when added to the infusion cocktail, provides about 100 to about 400 ppm of each compound. Release agents can be incorporated into the present infusion cocktail at a level of 0 to about 0.4 percent, preferably at about 0.2 to about 0.4 percent. Release agents include lecithin, high stability vegetable oils, mono and diglycerides, polyoxyethylene sorbitan monooleate (ie.g., Tween 80™), mineral salts of fatty acids, emulsifier-oil blends, and/or emulsions thereof. A preferred release agent is a high HLB (i.e., about 8 to about 10) soy lecithin. An especially preferred release agent is Precept 8160 (Central Soya Co.) which is a powdered, deoiled, refined, and enzyme-modified soybean lecithin having an HLB of about 9. The use of such a release agent improves the handling characteristics of the infused vegetables during the remainder of the process. Calcium lactate can be included in the infusion cocktail at a level of 0 to about 3 percent, and more preferably present at about 0.5 to about 2 percent. A suitable calcium lactate can be obtained from PURAC America as the pentahydrate. Calcium lactate provides a number of benefits since it can potentially act as a secondary antimicrobial agent, as a water activity depressant, as a pH modifier, and as a highly water-soluble and bio-available source of calcium.

The infusion cocktail is prepared by simply mixing or combining the components with gentle agitation to form an essentially homogenous slurry, suspension, or infusion bath. The pH of the infusion cocktail should generally be about 4.5 or higher, preferably about 4.5 to 7, and more preferably about 5 to about 6. Normally, the infusion cocktail or bath is heated to, and held at, a temperature of greater than about 165° F. for about two minutes and then cooled to its operating temperature. Preferably, the infusion cocktail is maintained at an operating temperature of about 50 to about 120° F., preferably about 70 to about 120° F., during use. Using these infusion cocktail formulations, intermediate moisture vegetables which are shelf stable and, when cooked, provide appearance, texture, and taste similar to that provided by high quality cooked frozen vegetables can be prepared. Moreover, the intermediate moisture vegetables of this invention readily, quickly, and uniformly rehydrate when cooked. Such intermediate moisture vegetables are ideally suited for use in dry mixes such as soups, casseroles, salads, oriental or stir fry type dishes, and the like. Of course, the infusion cocktail can include other components such as, for example, spices, flavorants, other preservatives, nutrients, vitamins, nutraceutical additives, and the like.

The intermediate moisture vegetables of the present invention are prepared by (a) infusing vegetables with the antimicrobial infusion cocktail of the present invention at a temperature of greater than about 50° F. for about 15 to about 180 minutes; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables. The process of the present invention may be operated in batch, semi-continuous, or continues mode as desired. Generally, the present process is carried out at ambient pressures. The present invention can be used to prepare a wide variety of green, yellow, orange, and red vegetables. Such vegetables include, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like. Generally, the vegetables are first cut into appropriate sizes (generally pieces of ½inch or less in their longest dimension) prior to infusion; larger pieces can be used, if desired, so long as the infusion process is modified (e.g., increased temperatures and/or duration) to allow for sufficient infusion of the cocktail. Of course, smaller vegetables such as peas and pea-pods can be, and preferably are, used whole without any reduction in size. Both frozen (especially the instantly frozen type) vegetables and fresh vegetables can be used in the present invention. The vegetables are preferably blanched (e.g., cooked in a water bath at about 165° F. or greater for up to about 10 minutes) prior to the infusion process.

The vegetables, reduced in size if appropriate, are placed in the infusion cocktail. The vegetable pieces should remain in the infusion cocktail at a temperature and for a time sufficient to allow the infusion cocktail to infuse into, and preferably throughout, the internal vegetable structures. Generally, infusion is considered sufficient if the vegetables obtain a solids level of at least about 30 percent. Generally, a temperature of greater than about 50° F. and a time of about 15 to about 180 minutes is sufficient. Preferably, the infusion cocktail is at, or heated up to, about 70 to about 120° F., and more preferably, about 80 to about 100° C.; preferably, the vegetable pieces remain in the infusion cocktail for about 45 to about 75 minutes. Preferably the vegetables are subjected to gentle agitation during infusion to provide more uniform uptake of the infusion cocktail. The present invention can be operated in a batch, semi-continuous, or continuous manner. If desired, the infusion cocktail can be reused by adding make-up ingredients and/or fresh infusion cocktail.

Once infusion is complete, the vegetables pieces are removed from the infusion cocktail and excess liquid (i.e., infusion cocktail) is removed from the outer surfaces of the vegetable pieces. Generally, the excess liquid is removed by draining (with or without gentle agitation) or more active processing techniques such as, for example, compressed gas or air sprays or blades (e.g., passing the vegetable pieces through a sterile air curtain), centrifugation, and the like. Generally, water washes are not necessary or desirable. After the excess liquid is removed, the vegetable pieces are then dried to a water activity of about 0.5 to about 0.9 using conventional drying techniques to form the intermediate moisture vegetables. The water activity can be adjusted depending on the use intended for the intermediate moisture vegetables. For example, intermediate moisture vegetables dried to a water activity of about 0.75 to about 0.85 (and properly packaged) are expected to have a shelf life of about 90 days under refrigeration conditions; intermediate moisture vegetables dried to a water activity of about 0.55 to about 0.65 (and properly packaged) are expected to have a shelf life of about 12 months under ambient conditions. It is generally preferred that gentle drying conditions for relatively short time periods be used to prevent case hardening, ensure fast equilibrium after drying, and quick rehydration when cooked or otherwise prepared for consumption.

If desired, the infused vegetable pieces may be treated prior to drying with, for example, release agents such as lecithin, high stability vegetable oils, and emulsions thereof in order to improve handling of the final product. Such a treatment, generally at a level of about 0.1 to 0.5 percent, can reduce surface adhesion and/or dumpiness of the vegetable pieces during and after the drying process (including the final product). Other additives can also be applied with the lecithin and/or high stability vegetable oils. Such additives could include spices, flavorants, nisin-containing cultured whey or other nisin-containing compositions, other preservatives, nutrients, vitamins, nutraceutical additives, and the like. Alternatively, the lecithin, high stability vegetable oils, and emulsions thereof could also be incorporated in the infusion cocktail.

Once dried and cooled, the intermediate moisture vegetables can be packaged. They may be packaged separately or combined with other ingredients before packaging (e.g., meal kits). Preferably, the packaging material is designed to prevent, or at least significantly reduce, color and quality degradation, deterioration, or loss during storage. Preferably, the intermediate moisture vegetable are sealed in oxygen impermeable and light resistant or light proof packaging materials such as, for example, aluminum-polyester film under substantially oxygen-free conditions. Such substantially oxygen-free conditions can be obtained, for example, by inert gas (e.g., $N_2$ or $CO_2$) flushing prior to sealing or using vacuum packing techniques. The resulting intermediate moisture vegetables provide shelf stable, high quality vegetables having, when cooked or rehydrated by the consumer, organoleptic properties similar to instantly frozen or fresh vegetables.

The following examples are intended to illustrate the invention and not to limit it. Unless otherwise indicated, all percentages using in the present specification are by weight.

EXAMPLE 1

This example illustrates the preparation of intermediate moisture carrots of the present invention. Diced carrots (instantly quick-frozen; 10 pounds) were cooked for 2 minutes at about 200° F. The cooked carrots were placed in control and inventive infusion cocktails (50 pounds each). The composition of the infusion cocktails were as follows:

| Ingredient | Control Sample | Inventive Sample |
| --- | --- | --- |
| Water (food grade) | 48.6% | 40.8% |
| High Maltose Corn Syrup (Satinsweet 65; Cargill) | 25.5% | 25.0% |
| Anhydrous Dextrose (Corn Products) | 15.0% | 15.0% |
| Glycerine (food grade) | 10.0% | 10.0% |
| Nisin-Containing Whey | 0 | 8.3% |
| Salt | 0.5% | 0.5% |
| Super Envision ® (Domino Sugar) | 0.35% | 0.35% |
| Carrot Flavor | 0.05% | 0.05% |

Anhydrous dextrose was included as a secondary source for the low sweetness carbohydrate; dextrose has about 70 percent sweetness as compared to sucrose. In later experiments, the anhydrous dextrose was eliminated thereby reducing sweetness even further. The infusion cocktails (control and inventive) had a solids content of about 42 percent.

Infusion was carried out in stainless steel, jacketed kettles equipped with agitators at 100±10° F. for about two hours. The resulting infused diced carrots attained a solids content of about 35 percent. The infused carrots were either spun in a centrifuge or drained using gently shaking to remove excess infusion cocktail.

The infused carrots were then dried on wire mesh trays in a hot air oven at 150±10° F. to obtain a target water activity of 0.8; such a water activity was obtained in about 3.5 hours. The dried carrots were allowed to equilibrate in a closed polyethylene bag for about 24 hours under refrigeration conditions and then packaged in light-proof, multi-barrier laminated film pouches. Air in the pouches was first removed using a vacuum; after a $CO_2$ flush, the pouches were sealed.

Both the control and inventive intermediate moisture products, once sealed, were stored under refrigeration conditions (about 40° F.) for 90 days and then evaluated for bacterial growth at room temperature. On the control sample, bacterial growth had reached about 200 cfu/g at 10 days and about 600 cfu/g at 20 days. In comparison, the inventive sample had less than 10 cfu/g after 20 days.

The inventive intermediate moisture carrots had excellent color, non-glossy/non-powdery appearance, sweetness comparable to frozen and/or fresh carrots, semi-soft texture, and a peasant carrot aroma. Upon cooking in a meal kit application, the inventive carrots had excellent texture, complete hydration, virtually no sweetness, and a very good color. Evaluation using a test panel confirmed that the inventive intermediate moisture carrots, when cooked, had organoleptic properties very similar to frozen or fresh carrots. Indeed, most panelists rated the inventive intermediate moisture carrots to be as good as, and often better, than similar instantly frozen carrots used as the starting material.

EXAMPLE 2

This example illustrates the preparation of intermediate moisture broccoli florets of the present invention. Procedures were similar to those used in Example 1. Twelve and a half pounds of IQF broccoli florets (about 1 inch size) were infused using 50 pounds of the following infusion cocktail.

| Ingredient | Amount (%) |
| --- | --- |
| Water (food grade) | 37.8 |
| High Maltose Corn Syrup (HM70, Cargill) | 51.0 |
| Calcium Lactate Pentahydrate (PURAC America) | 2.0 |
| Glycerine (food grade) | 6.2 |
| Nisin-Containing Whey (50%) | 2.0 |
| Salt | 0.3 |
| Sodium Benzoate | 0.02 |
| Potassium Sorbate | 0.02 |
| Super Envision ® (Domino Sugar) | 0.5 |
| Soy Lecithin (Precept 8160, Central Soya) | 0.2 |

The broccoli florets were maintained in the infusion cocktail at about 70 to 90° F. for about one hour with gentle agitation. The broccoli were removed from the infusion cocktail and drained. The drained broccoli florets were then finally subjected to gentle spinning and/or shaking to remove any remaining liquid. After spraying with high stability vegetable oil, the product was dried at 130° F. for about 2 to 3 hours to obtain a water activity of about 0.8; the overall level of vegetable oil added was about 0.25 percent. After drying and packaging, the product can be stored at refrigerated temperatures for about 90 days while maintaining excellent organoleptic properties. A trained test panel found the quality of the infused product comparable to freshly prepared broccoli florets.

EXAMPLE 3

This example illustrates the preparation of intermediate moisture carrots of the present invention using an infusion cocktail without the nisin-containing whey ingredient. Diced carrots (instantly quick-frozen; 300 pounds) were cooked for 2 minutes at about 200° F. The cooked carrots were placed in an infusion cocktail (1500 pounds). The composition of the infusion cocktail was as follows:

| Ingredient | Cocktail |
| --- | --- |
| Water (food grade) | 52.0% |
| High Maltose Corn Syrup (Satinsweet 65; Cargill) | 31.1% |
| Anhydrous Dextrose (Corn Products) | 8.0% |
| Glycerine (food grade) | 8.0% |
| Salt | 0.4% |
| Super Envision ® (Domino Sugar) | 0.5% |

Infusion was carried out in stainless steel, jacketed kettles equipped with agitators at 110±10° F. for about two hours. The resulting infused diced carrots attained a solids content of about 35 percent. The infused carrots were washed with a water spray to remove excess infusion cocktail.

The infused carrots were then freeze dried to obtain a target water activity of about 0.6±0.5; the final water activity was 0.62. The dried carrots were allowed to equilibrate in closed polyethylene bags for about 24 hours under refrigeration conditions and then packaged in light-proof, multi-barrier laminated film pouches. Air in the pouches was first removed using a vacuum; after a $CO_2$ flush, the pouches were sealed. The intermediate moisture product, once sealed, was stored under ambient conditions (about 70±20 F.) for 270 days. The finished product had acceptable organoleptic and microbiological properties. The resulting product is expected to have a shelf life of about one year under such conditions.

EXAMPLE 4

This example illustrates the preparation of intermediate moisture carrots of the present invention using an infusion cocktail without the nisin-containing whey ingredient. A fifty pound batch of the infusion cocktail was prepared using the following formulation:

| Ingredient | Cocktail (%) |
| --- | --- |
| Water (food grade) | 9.1 |
| High Maltose Corn Syrup (HM70; Cargill) | 78.7 |
| Carrot Flavor | 0.045 |
| Glycerine (food grade) | 10.7 |
| Salt | 0.55 |
| Super Envision ® (Domino Sugar) | 0.91 |

In a steam-jacketted kettle equipped with scrape surface paddle and an agitator, water was heated to 125° F. Salt, carrot flavor, and Super Envision® were mixed with glycerine and transferred into kettle and dissolved completely. Pre-warmed (about 120° F.) high maltose corn syrup was added and mixed for another 5 minutes. The temperature of the infusion media was raised to 175° F. and held for two minutes and then cooled quickly to 70° F.

Diced carrots (12.5 pounds) were placed in 50 pounds infusion cocktail (water activity 0.71 and total solids level 74.9 percent) and the temperature of the infusion media and carrots was brought up to 100° F. The infusion process continued for 60 minutes under gentle agitation under atmospheric pressure. The carrots were drained and the surface media was removed using centrifuge at low speed. The carrots pieces were then dried in a convection oven at 135° F. to a target water activity of 0.60±0.05 (measured value was 0.57). The infused-dried carrots were equilibrated in polylined plastic pail for at least 24 hours. The finished product was packaged in light-proof laminated pouches using a $CO_2$ flush.

The samples were found to be excellent in texture, appearance, flavor and were very comparable to control IQF carrot dices, when both were evaluated after cooking for 3 minutes in boiling water. The samples were considered microbiologically acceptable.

We claim:

1. An antimicrobial infusion cocktail suitable for preparing intermediate moisture vegetables which are shelf stable and, when cooked, provide appearance, texture, and taste similar to that provided by cooked frozen vegetables, said antimicrobial infusion cocktail comprising an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture.

2. The antimicrobial infusion cocktail of claim 1, wherein the antimicrobial infusion cocktail contains (1) about 30 to about 65 percent of the water-soluble, predominantly lower molecular weight, low sweetness carbohydrate, (2) about 1 to about 15 percent of the polyhydric alcohol, (3) about 0.1 to about 0.7 percent salt, (4) about 0.1 to about 1 percent of the non-inorganic sweetness depressant agent, and (5) about 1 to about 8 percent of the nisin-containing whey derived from a nisin-producing culture.

3. The antimicrobial infusion cocktail of claim 2, wherein the antimicrobial infusion cocktail further contains (6) 0 to about 2000 ppm of an anti-mycotic agent, (7) about 0 to about 0.5 percent of a release agent, and (8) 0 to about 3 percent calcium lactate.

4. The antimicrobial infusion cocktail of claim 2, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy)propionic acid or an alkali metal salt thereof.

5. The intermediate moisture vegetables of claim 4, wherein the vegetables are infused with the antimicrobial infusion cocktail at a temperature of about 70 to about 120° F. for about 45 to about 75 minutes; and wherein the water activity of the collected vegetables is about 0.75 to about 0.85; and wherein the packaged intermediate moisture vegetables have a shelf life of about 90 days under refrigeration conditions.

6. The intermediate moisture vegetables of claim 5, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

7. The antimicrobial infusion cocktail of claim 1, wherein the antimicrobial infusion cocktail contains (1) about 40 to about 60 percent of the water-soluble, predominantly lower molecular weight, low sweetness carbohydrate, (2) about 6 to about 10 percent of the polyhydric alcohol, (3) about 0.3 to about 0.5 percent salt, (4) about 0.5 to about 0.7 percent of the non-inorganic sweetness depressant agent, and (5) about 2 to about 4 percent of the nisin-containing whey derived from a nisin-producing culture.

8. The antimicrobial infusion cocktail of claim 7, wherein the antimicrobial infusion cocktail further contains (6) about 100 to 800 ppm of an anti-mycotic agent, (7) about 0.2 to about 0.4 percent of a release agent, and (8) about 0.5 to about 2 percent calcium lactate.

9. The antimicrobial infusion cocktail of claim 7, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy) propionic acid or an alkali metal salt thereof.

10. Intermediate moisture vegetables which are shelf stable and, when cooked, provide appearance, texture, and taste similar to that provided by cooked frozen vegetables, said intermediate moisture vegetables prepared by a process comprising (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables.

11. The intermediate moisture vegetables of claim 10, wherein the antimicrobial infusion cocktail contains (1) about 30 to about 65 percent of the water-soluble, predominantly lower molecular weight, low sweetness carbohydrate, (2) about 1 to about 15 percent of the polyhydric alcohol, (3) about 0.1 to about 0.7 percent salt, (4) about 0.1 to about 1 percent of the non-inorganic sweetness depressant agent, and (5) about 1 to about 8 percent of the nisin-containing whey derived from a nisin-producing culture.

12. The intermediate moisture vegetables of claim 11, wherein the antimicrobial infusion cocktail further contains (6) 0 to about 2000 ppm of an anti-mycotic agent, (7) about 0 to about 0.5 percent of a release agent, and (8) 0 to about 3 percent calcium lactate.

13. The intermediate moisture vegetables of claim 11, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy) propionic acid or an alkali metal salt thereof.

14. The intermediate moisture vegetables of claim 11, wherein the vegetables are infused with the antimicrobial infusion cocktail at a temperature of about 70 to about 120° F. for about 45 to about 75 minutes; and wherein the water activity of the collected vegetables is about 0.55 to about 0.65; and wherein the packaged intermediate moisture vegetables have a shelf life of about 12 months under ambient conditions.

15. The intermediate moisture vegetables of claim 10, wherein the antimicrobial infusion cocktail contains (1) about 40 to about 60 percent of the water-soluble, predominantly lower molecular weight, low sweetness carbohydrate, (2) about 6 to about 10 percent of the polyhydric alcohol, (3) about 0.3 to about 0.5 percent salt, (4) about 0.5 to about 0.7 percent of the non-inorganic sweetness depressant agent, and (5) about 2 to about 4 percent of the nisin-containing whey derived from a nisin-producing culture.

16. The intermediate moisture vegetables of claim 15, wherein the antimicrobial infusion cocktail further contains (6) about 100 to 800 ppm of an anti-mycotic agent, (7) about 0.2 to about 0.4 percent of a release agent, and (8) about 0.5 to about 2 percent calcium lactate.

17. The intermediate moisture vegetables of claim 15, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy) propionic acid or an alkali metal salt thereof.

18. The intermediate moisture vegetables of claim 15, wherein the vegetables are infused with the antimicrobial infusion cocktail at a temperature of about 70 to about 120° F. for about 45 to about 75 minutes; and wherein the water activity of the collected vegetables is about 0.75 to about 0.85; and wherein the packaged intermediate moisture vegetables have a shelf life of about 90 days under refrigeration conditions.

19. The intermediate moisture vegetables of claim 15, wherein the vegetables are infused with the antimicrobial infusion cocktail at a temperature of about 70 to about 120° F. for about 45 to about 75 minutes; and wherein the water activity of the collected vegetables is about 0.55 to about 0.65; and wherein the packaged intermediate moisture vegetables have a shelf life of about 12 months under ambient conditions.

20. The intermediate moisture vegetables of claim 19, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

21. The intermediate moisture vegetables of claim 10, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

22. A method for preparing intermediate moisture vegetables which are shelf stable and which, when cooked, provide appearance, texture, and taste similar to that provided by cooked frozen vegetables, said method comprising (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables.

23. The method of claim 22, wherein the antimicrobial infusion cocktail contains (1) about 30 to about 65 percent of the water-soluble, predominantly lower molecular weight, low sweetness carbohydrate, (2) about 1 to about 15 percent of the polyhydric alcohol, (3) about 0.1 to about 0.7 percent salt, (4) about 0.1 to about 1 percent of the non-inorganic sweetness depressant agent, and (5) about 1 to about 8 percent of the nisin-containing whey derived from a nisin-producing culture.

24. The method of claim 23, wherein the antimicrobial infusion cocktail further contains (6) 0 to about 2000 ppm of an anti-mycotic agent, (7) about 0 to about 0.5 percent of a release agent, and (8) 0 to about 3 percent calcium lactate.

25. The method of claim 23, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy) propionic acid or an alkali metal salt thereof.

26. The method of claim 23, wherein the vegetables are infused with the antimicrobial infusion cocktail at a temperature of about 70 to about 120° F. for about 45 to about 75 minutes; and wherein the water activity of the collected vegetables is about 0.75 to about 0.85; and wherein the packaged intermediate moisture vegetables have a shelf life of about 90 days under refrigeration conditions.

27. The method of claim 23, wherein the vegetables are infused with the antimicrobial infusion cocktail at a temperature of about 70 to about 120° F. for about 45 to about 75 minutes; and wherein the water activity of the collected vegetables is about 0.55 to about 0.65; and wherein the packaged intermediate moisture vegetables have a shelf life of about 12 months under ambient conditions.

28. The method of claim 22, wherein the antimicrobial infusion cocktail contains (1) about 40 to about 60 percent of the water-soluble, predominantly lower molecular weight, low sweetness carbohydrate, (2) about 6 to about 10 percent of the polyhydric alcohol, (3) about 0.3 to about 0.5 percent salt, (4) about 0.5 to about 0.7 percent of the non-inorganic sweetness depressant agent, and (5) about 2 to about 4 percent of the nisin-containing whey derived from a nisin-producing culture.

29. The method of claim 28, wherein the antimicrobial infusion cocktail further contains (6) about 100 to 800 ppm of an anti-mycotic agent, (7) about 0.2 to about 0.4 percent of a release agent, and (8) about 0.5 to about 2 percent calcium lactate.

30. The method of claim 28, wherein the low sweetness carbohydrate is a high maltose corn syrup; wherein the polyhydric alcohol is selected from the group consisting of glycerol, ethylene glycol, erythritol, pentaerythritol, propylene glycol, and sugar alcohols of the general formula $CH_2OH(CHOH)_nCH_2OH$ where n is 2 to 5; and wherein the non-inorganic sweetness depressant agent is 2-(4-methoxyphenoxy) propionic acid or an alkali metal salt thereof.

31. The method of claim 28, wherein the vegetables are infused with the antimicrobial infusion cocktail at a temperature of about 70 to about 120° F. for about 45 to about 75 minutes; and wherein the water activity of the collected vegetables is about 0.75 to about 0.85; and wherein the packaged intermediate moisture vegetables have a shelf life of about 90 days under refrigeration conditions.

32. The method of claim 31, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

33. The method of claim 28, wherein the vegetables are infused with the antimicrobial infusion cocktail at a temperature of about 70 to about 120° F. for about 45 to about 75 minutes; and wherein the water activity of the collected vegetables is about 0.55 to about 0.65; and wherein the packaged intermediate moisture vegetables have a shelf life of about 12 months under ambient conditions.

34. The method of claim 33, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

35. The method of claim 22, wherein the vegetables are selected from the group consisting of carrots, peppers, broccoli, peas, pea-pods, cauliflower, onions, tomatoes, mushrooms, zucchini, corn, celery, asparagus, green beans, water chestnuts, and bamboo shoots.

* * * * *